(12) United States Patent
Misra et al.

(10) Patent No.: US 11,789,633 B2
(45) Date of Patent: Oct. 17, 2023

(54) COLLABORATIVE LEARNING-BASED CLOUD MIGRATION IMPLEMENTATION

(71) Applicant: ACCENTURE GLOBAL SOLUTIONS LIMITED, Dublin (IE)

(72) Inventors: Janardan Misra, Bangalore (IN); Sanjay Mittal, Bangalore (IN); Ravi Kiran Velama, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/736,711

(22) Filed: May 4, 2022

(65) Prior Publication Data
US 2023/0273738 A1    Aug. 31, 2023

(30) Foreign Application Priority Data
Feb. 25, 2022 (IN) .............................. 202211010169

(51) Int. Cl.
*G06F 3/06* (2006.01)
(52) U.S. Cl.
CPC .......... *G06F 3/0647* (2013.01); *G06F 3/0604* (2013.01); *G06F 3/067* (2013.01)
(58) Field of Classification Search
None
See application file for complete search history.

(56) References Cited

U.S. PATENT DOCUMENTS

| 9,612,765 | B2 | 4/2017 | Huang et al. |
| 11,016,954 | B1* | 5/2021 | Babocichin ........... G06F 16/258 |
| 2009/0228629 | A1* | 9/2009 | Gebhart .............. G06F 9/45558 |
| | | | 711/6 |
| 2016/0212061 | A1* | 7/2016 | Birkestrand ........ H04L 67/1008 |

OTHER PUBLICATIONS

Vukovic Maja et al., "Cloud migration using automated planning", NOMS 2016, 2016 IEEE/IFIP Network Operations and Management Symposium, Apr. 25, 2016, pp. 96-103.

* cited by examiner

*Primary Examiner* — Brian R Peugh
(74) *Attorney, Agent, or Firm* — Mannava & Kang, P.C.

(57) ABSTRACT

In some examples, collaborative learning-based cloud migration implementation may include identifying a migration agent that is to perform an application migration from a first cloud environment to a second cloud environment, and identifying a plurality of additional migration agents. A technical context and a migration flow context may be determined for the migration agent and for the plurality of additional migration agents. Executed allowed and error-response migration actions may be identified for states that are similar to a current state of the application migration, and a similarity between the migration agent and each of the migration agents that executed the allowed and error-response migration actions may be determined. A migration action that is to be performed may be identified based on a maximum relevance associated with the allowed and error-response migration actions. The identified migration action may be executed by the migration agent to perform the application migration.

20 Claims, 6 Drawing Sheets

400

```
┌─────────────────────────────────────────────────────────────┐
│ IDENTIFY A MIGRATION AGENT THAT IS TO PERFORM AN APPLICATION│
│ MIGRATION FROM A FIRST CLOUD ENVIRONMENT TO A SECOND CLOUD  │
│                         ENVIRONMENT                         │
│                             402                             │
└─────────────────────────────────────────────────────────────┘
                              ▼
┌─────────────────────────────────────────────────────────────┐
│        IDENTIFY A PLURALITY OF ADDITIONAL MIGRATION AGENTS  │
│                             404                             │
└─────────────────────────────────────────────────────────────┘
                              ▼
┌─────────────────────────────────────────────────────────────┐
│  DETERMINE A SIMILARITY BETWEEN THE MIGRATION AGENT THAT IS │
│   TO PERFORM THE APPLICATION MIGRATION AND EACH OF THE      │
│         PLURALITY OF ADDITIONAL MIGRATION AGENTS            │
│                             406                             │
└─────────────────────────────────────────────────────────────┘
                              ▼
┌─────────────────────────────────────────────────────────────┐
│ DETERMINE, BASED ON THE SIMILARITY BETWEEN THE MIGRATION    │
│ AGENT THAT IS TO PERFORM THE APPLICATION MIGRATION AND      │
│ EACH OF THE PLURALITY OF ADDITIONAL MIGRATION AGENTS,       │
│                    RELEVANCE VALUES                         │
│                             408                             │
└─────────────────────────────────────────────────────────────┘
                              ▼
┌─────────────────────────────────────────────────────────────┐
│ IDENTIFY, BASED ON THE RELEVANCE VALUES, A MIGRATION ACTION │
│  THAT IS TO BE PERFORMED FOR THE APPLICATION MIGRATION      │
│                             410                             │
└─────────────────────────────────────────────────────────────┘
                              ▼
┌─────────────────────────────────────────────────────────────┐
│ EXECUTE, BY THE MIGRATION AGENT THAT IS TO PERFORM THE      │
│ APPLICATION MIGRATION, THE IDENTIFIED MIGRATION ACTION      │
│                             412                             │
└─────────────────────────────────────────────────────────────┘
```

*FIG. 4*

COLLABORATIVE LEARNING-BASED CLOUD MIGRATION IMPLEMENTATION

PRIORITY

The present application claims priority under 35 U.S.C. 119(a)-(d) to India Non-Provisional Patent Application Serial No. 202211010169, filed Feb. 25, 2022, the disclosure of which is hereby incorporated by reference in its entirety.

BACKGROUND

Cloud migration may be described as a process of moving, via a migration path, an organization's digital assets, services, databases, information technology (IT) resources, and applications either partially, or wholly, into the cloud. Cloud migration may also include moving from one cloud to another.

BRIEF DESCRIPTION OF DRAWINGS

Features of the present disclosure are illustrated by way of example and not limited in the following figure(s), in which like numerals indicate like elements, in which:

FIG. 4 illustrates a flowchart of an example method for collaborative learning-based cloud migration implementation in accordance with an example of the present disclosure.

DETAILED DESCRIPTION

Figure 1:
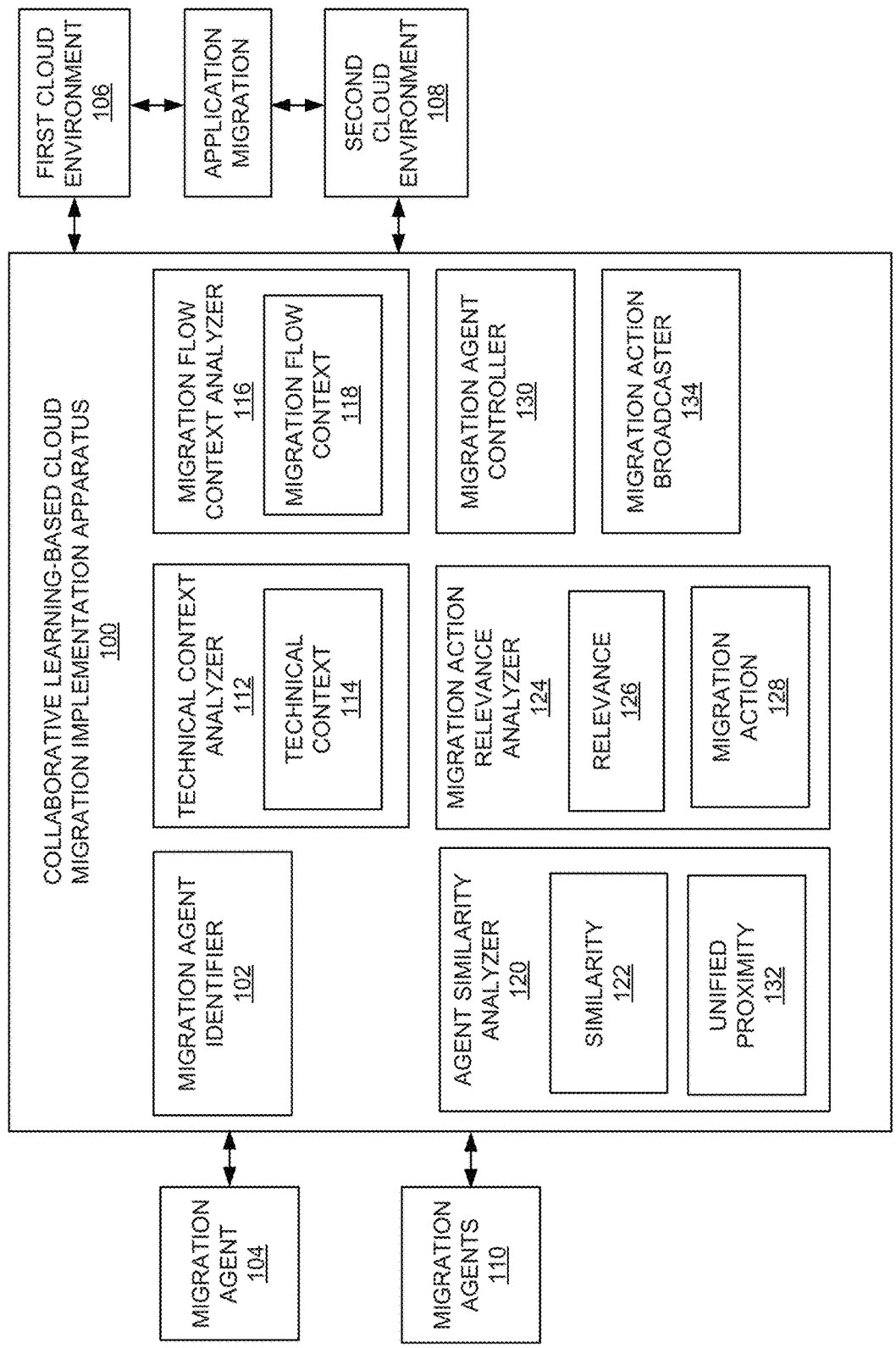
FIG. 1 illustrates a layout of a collaborative learning-based cloud migration implementation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Collaborative learning-based cloud migration implementation apparatuses, methods for collaborative learning-based cloud migration implementation, and non-transitory computer readable media having stored thereon machine readable instructions to provide collaborative learning-based cloud migration implementation are disclosed herein. The apparatuses, methods, and non-transitory computer readable media disclosed herein provide for dynamic determination of migration paths (e.g., a sequence of migration actions as disclosed herein) in collaboration with other migration agents with continuous learning and evolution. In this regard, the apparatuses, methods, and non-transitory computer readable media disclosed herein provide for dynamic runtime collaboration among migration agents (e.g., computational processes executing migration of applications), which may involve collective broadcast-based interaction among agents, and determination of a next migration action based upon collective analysis of information received from other agents based upon inter agent context and flow similarities.

Cloud migration is a technically challenging, organizational critical, and cost intensive process. One of the reasons cloud migration is technically challenging is because it is difficult to ensure success of a planned migration path as new errors may arise during any of the phases of migration. Therefore, the ability to decide an optimal migration path and anticipate errors well before their occurrence is essential for the migration process to successfully complete.

In order to address at least the aforementioned technical challenges, the apparatuses, methods, and non-transitory computer readable media disclosed herein provide an automated solution to help migration agents learn a likelihood of success of their planned actions or suggest better alternatives. The apparatuses, methods, and non-transitory computer readable media disclosed herein provide for the design of migration agents which collaboratively learn dynamically during run-time from one another on how to select optimal steps during migrations and their likelihood of success.

According to examples disclosed herein, the apparatuses, methods, and non-transitory computer readable media disclosed herein provide for the design of a computational agent for identifying an optimal migration path with a maximum possible likelihood to successfully complete a migration process for a maximum number of migration agents. The apparatuses, methods, and non-transitory computer readable media disclosed herein provide for minimization of resource utilization by anticipating failures before their actual occurrences.

According to examples disclosed herein, the apparatuses, methods, and non-transitory computer readable media disclosed herein provide for the reduction of computational resources (e.g., processor time, network bandwidth, and energy) by enabling migration agents to learn from one another. Further, the apparatuses, methods, and non-transitory computer readable media disclosed herein provide for selection of an optimal path for completing migration, or taking of preemptive steps if a currently planned migration path may lead to a failure state.

The apparatuses, methods, and non-transitory computer readable media disclosed herein may be implemented for migration scenarios that include cloud migration (e.g., primary domain), migration of applications across different operating environments, migration of applications across different versions of backend software, process migration (e.g., human resource system migration from one information system to another), etc.

According to an example of application of the apparatuses, methods, and non-transitory computer readable media disclosed herein, with respect to external compliance requirements, regulatory compliance requirements and industry standards are difficult to comply and subject to oversight in a migration project of large scale. In such a scenario, communication between migration bots would be highly effective. In a first scenario, migration project A has steps defined that cater to financial compliance requirements for Europe, and migration project B in the same region and industry domain has not planned these steps and is heading for non-compliance. In such a scenario, Bot B may learn from Bot A and take corrective actions to ensure compliance. In a second scenario, both project A and project B have not considered the regulatory compliance requirements. Project A may be finished first, and a non-compliance issue has been found post migration in production. This knowledge may immediately be transferred from Bot A to Bot B. By doing so, project B may avoid any fines and legal hurdles. Thus, the apparatuses, methods, and non-transitory computer readable media disclosed herein provide for avoidance of such compliance issues, in this case for projects with no direct communication links.

According to another example of application of the apparatuses, methods, and non-transitory computer readable media disclosed herein, with respect to tradeoff evaluation, project A has taken a refactoring approach to cloud migration, while project B has taken a lift and shift approach for a technically similar migration. A new migration agent C may communicate with agent A and agent B to determine the cost versus speed to market tradeoff between project A and project B. These aspects may help agent C create the best migration path for a new project.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example collaborative learning-based cloud migration implementation apparatus (hereinafter also referred to as "apparatus 100").

Referring to FIG. 1, the apparatus 100 may include a migration agent identifier 102 that is executed by at least one hardware processor (e.g., the hardware processor 302 of FIG. 3, and/or the hardware processor 504 of FIG. 5) to identify a migration agent 104 that is to perform an application migration from a first cloud environment 106 to a second cloud environment 108. Further, the migration agent identifier 102 may identify a plurality of additional migration agents 110.

A technical context analyzer 112 that is executed by at least one hardware processor (e.g., the hardware processor 302 of FIG. 3, and/or the hardware processor 504 of FIG. 5) may determine, for the migration agent 104 that is to perform the application migration and for each migration agent of the plurality of additional migration agents 110, a technical context 114.

A migration flow context analyzer 116 that is executed by at least one hardware processor (e.g., the hardware processor 302 of FIG. 3, and/or the hardware processor 504 of FIG. 5) may determine, for the migration agent 104 that is to perform the application migration and for each migration agent of the plurality of additional migration agents 110, a migration flow context 118.

An agent similarity analyzer 120 that is executed by at least one hardware processor (e.g., the hardware processor 302 of FIG. 3, and/or the hardware processor 504 of FIG. 5) may identify, for the plurality of additional migration agents 110, executed allowed and error-response migration actions for states that are similar to a current state of the application migration. Further, the agent similarity analyzer 120 may determine, based on the technical context 114 and the migration flow context 118, a similarity 122 between the migration agent 104 that is to perform the application migration and each of the migration agents that executed the allowed and error-response migration actions for states that are similar to the current state of the application migration.

A migration action relevance analyzer 124 that is executed by at least one hardware processor (e.g., the hardware processor 302 of FIG. 3, and/or the hardware processor 504 of FIG. 5) may determine, based on the similarity 122 between the migration agent 104 that is to perform the application migration and each of the identified migration agents that executed the allowed and error-response migration actions for states that are similar to the current state of the application migration, a relevance 126 of each of the allowed and error-response migration actions for states that are similar to the current state of the application migration. Further, the migration action relevance analyzer 124 may identify, based on a maximum relevance associated with the allowed and error-response migration actions for states that are similar to the current state of the application migration, a migration action 128 that is to be performed for the application migration.

A migration agent controller 130 that is executed by at least one hardware processor (e.g., the hardware processor 302 of FIG. 3, and/or the hardware processor 504 of FIG. 5) may execute, by the migration agent 104 that is to perform the application migration from the first cloud environment 106 to the second cloud environment 108, the identified migration action 128.

According to examples disclosed herein, the agent similarity analyzer 120 may determine, based on the technical context 114 and the migration flow context 118, the similarity 122 between the migration agent 104 that is to perform the application migration and each of the migration agents that executed the allowed and error-response migration actions for states that are similar to the current state of the application migration by determining, based on the technical context 114 and the migration flow context 118, unified proximity 132. Further, the agent similarity analyzer 120 may determine, based on the unified proximity 132, the similarity 122 between the migration agent 104 that is to perform the application migration and each of the migration agents that executed the allowed and error-response migration actions for states that are similar to the current state of the application migration.

A migration action broadcaster 134 that is executed by at least one hardware processor (e.g., the hardware processor 302 of FIG. 3, and/or the hardware processor 504 of FIG. 5) may broadcast, based on the execution of the identified migration action 128, the identified migration action 128 to the plurality of additional migration agents 110.

According to examples disclosed herein, the migration action broadcaster 134 may broadcast, based on the execution of the identified migration action 128, the identified migration action 128 to the plurality of additional migration agents 110 by broadcasting the current state of the application migration and a time stamp associated with the identified migration action to the plurality of additional migration agents 110.

According to examples disclosed herein, the migration agent controller 130 may determine whether the identified migration action 128 leads to an error state, an intermediate migration state, or a success state. Further, based on a determination that the identified migration action 128 leads to the intermediate migration state, the migration agent controller 130 may generate an indication to determine a next migration action that is to be performed for the application migration.

According to examples disclosed herein, based on a determination that the identified migration action leads to the success state, the migration agent controller 130 may generate an indication of completion of the application migration.

According to examples disclosed herein, the agent similarity analyzer 120 may determine, based on the technical context 114 and the migration flow context 118, a time-difference based similarity 122 between the migration agent 104 that is to perform the application migration and each of the migration agents that executed the allowed and error-response migration actions for states that are similar to the current state of the application migration.

According to examples disclosed herein, the technical context analyzer 112 may determine, for the migration agent 104 that is to perform the application migration and for each migration agent of the plurality of additional migration agents 110, the technical context 114 by determining the technical context 114 as a function of a project context, a migration context, and an architectural context.

According to examples disclosed herein, the migration agent controller 130 may determine a likelihood of success of executing the identified migration action 128.

Figure 2:
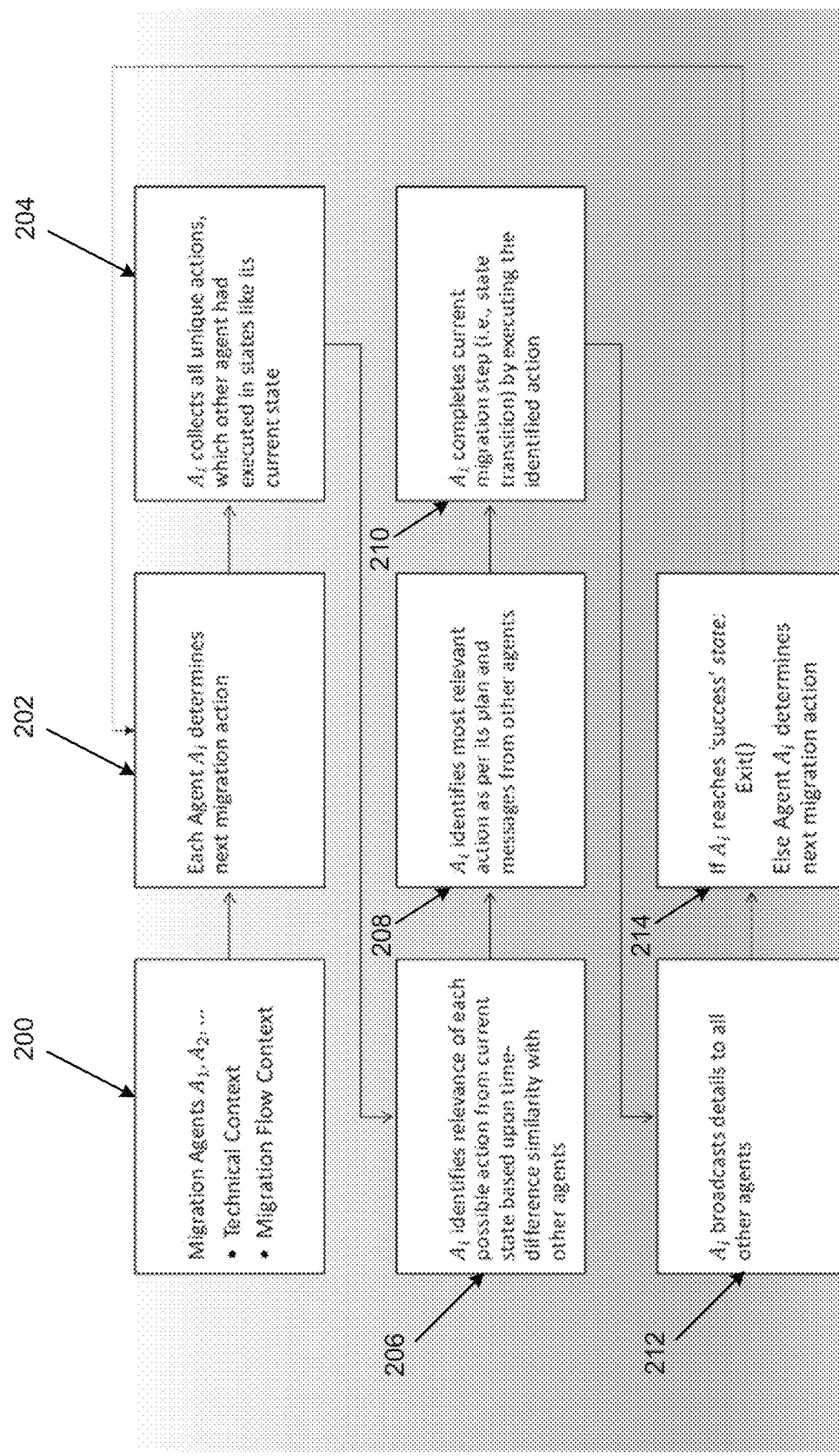
FIG. 2 illustrates a logical flow to illustrate operation of the collaborative learning-based cloud migration implementation apparatus of FIG. 1, in accordance with an example of the present disclosure.

FIG. 2 illustrates a logical flow to illustrate operation of the apparatus 100, in accordance with an example of the present disclosure.

Referring to FIGS. 1 and 2, and particularly FIG. 2, at block 200, the migration agent identifier 102 may identify the migration agent 104 that is to perform an application migration from a first cloud environment 106 to a second cloud environment 108. Further, the migration agent identifier 102 may identify the plurality of additional migration agents 110. In this regard, the state of the application migration may be determined by the design environment such that a migration process executed by the migration agent 104 is observed as a discrete sequence of states. For example, each sub-process or task may define a state. In general, every discrete program point may be a state. However, in practice, a state may be determined by considering granularity of a migration path as follows:

$\Psi(A)$: set of possible states for an agent $A \in \Delta$
$\Psi(\Delta) = \cup \Psi(A)$ //Set of all possible states across all migration agents (MAs).
$\Delta$: set of migration agents (also referred to henceforth as agents)
$\Delta(t) \subseteq \Delta$: agents active at time point t
per(A, s): returns set of allowed actions from state s for migration agent A
planned(A,s): returns set of allowed actions state s for migration agent A as per the original migration-plan Each migration agent may be associated with a technical context 114 that includes project details, migration process details, and architectural details. In this regard, the technical context analyzer 112 may determine, for the migration agent 104 that is to perform the application migration and for each migration agent of the plurality of additional migration agents 110, the technical context 114. Further, each migration agent may be associated with a migration flow context 118 at time point t that includes a sequence of states transitions. In this regard, the migration flow context analyzer 116 may determine, for the migration agent 104 that is to perform the application migration and for each migration agent of the plurality of additional migration agents 110, the migration flow context 118.

With respect to technical context 114, project context (e.g., project details) may include business domain (bd) such as a string (e.g., finance, media, healthcare, etc.), and technical domain (td) such as string (e.g., web, custom, legacy, COTS etc.). With respect to technical context 114, migration context (e.g., migration process details) may include migration strategy type (m), source OS (so) and target OS (to), source DB (sd) and target DB (td), and with upgrade (wu) Boolean (e.g., whether it involves any DB engine upgrade or change). With respect to technical context 114, architectural context may include a number of servers (ns), and volume of data (TB) (vd) (e.g., amount of database and flat files to be migrated). Architectural context (e.g., architectural details) may further include a number of applications (na), source hardware (sh), CI/CD pipeline (cc) Boolean (e.g., whether any continuous integration or continuous delivery pipelines are deployed in source system that needs to be migrated), cloud provider (cp) String, and type of target cloud (tc) (e.g., public, private, hybrid, sovereign etc.).

The technical context 114 for a migration agent may be characterized as follows:

techContext(agent A)=$[X_{pc}, X_{mc}, X_{ac}]$
$X_{pc} = (bd, td)_A$
$X_{mc} = \{m_A, (so, to)_A, (sd, td)_A, wu_A\}$,
$X_{ac} = [ns_A, vd_A, na_A, sh_A, cc_A, cp_A, tc_A]$ With respect to migration flow context 118, beginning with the migration's initiation process, migration agent may record the process flow as a sequences of states until the current state as follows:

migrationFlow(A)=$p_0 \rightarrow p_1 \rightarrow p_2 \rightarrow \ldots \rightarrow p_n$
$p_0$ Initial process/state of the migration
$p_1, \ldots, p_{n-1}$ Intermediate sub-processes/states
$p_n$ Sub-process/state at time point t Referring again to FIG. 2, at block 202, before taking a next action from state s, each migration agent A may perform the following estimates to collect unique non-error response actions (as list L) taken by all other collaborating agents from same state s, and at block 204, collect all unique error-response actions (as list $L_e$) taken by all other collaborating agents from same state S. In this regard, the agent similarity analyzer 120 may identify, for the plurality of additional migration agents 110, executed allowed and error-response migration actions for states that are similar to a current state of the application migration. The migration agent A may restrict its focus to only allowed and error-response actions as follows:

$L \leftarrow (L \cap per(A, s)) \cup L_e$

For each action, $x \in L$ identifies a set of agents which executed the action x by determining similarities with those agents using technical and flow contexts. In this regard, the agent similarity analyzer 120 may determine, based on the technical context 114 and the migration flow context 118, the similarity 122 between the migration agent 104 that is to perform the application migration and each of the migration agents that executed the allowed and error-response migration actions for states that are similar to the current state of the application migration.

Referring again to FIG. 2, at block 206, the migration action relevance analyzer 124 may determine, based on the similarity 122 between the migration agent 104 that is to perform the application migration and each of the identified migration agents that executed the allowed and error-response migration actions for states that are similar to the current state of the application migration, the relevance 126 of each of the allowed and error-response migration actions for states that are similar to the current state of the application migration. With respect to contextual proximity, technical contextual proximity between two agents may be determined as follows:

$f_{tp}(A,A') = \alpha_{pc}X_{pc} + \alpha_{mc}X_{mc} + \alpha_{ac}X_{ac}$ $X_{pc} = m((bd,td)_A, (bd,td)_{A'})$ $X_{mc} = m(m_A, m_{A'}) + m((sd,td)_A, (sd,td)_{A'}) + m((so,to)_A, (so,to)_{A'}) + m(wu_A, wu_{A'})$ $X_{ac} = m(ns_A, ns_{A'}) + m(vd_A, vd_{A'}) + m(na_A, na_{A'}) + m(sh_A, sh_{A'}) + m(cc_A, cc_{A'}) + m(cp_A, cp_{A'}) + m(tc_A, tc_{A'})$ $\alpha_{pc}$, $\alpha_{mc}$, and $\alpha_{ac}$ measure relative weights of proximities of different context types By default, $\alpha_{mc} > \alpha_{ac} > \alpha_{pc}$ $m((bd,td)_a, (bd,td)_b) = \text{mean}(\text{edit}(bd_a, bd_b), \text{edit}(td_a, td_b))$ $m(m_a, m_b) = \text{match}(m_a, m_b)$ $m((so,to)_a, (so,to)_b) = \text{mean}(\text{match}(so_a, so_b), \text{match}(to_a, to_b))$ $m((sd,td)_a, (sd,td)_b) = \text{mean}(\text{match}(sd_a, sd_b), \text{match}(td_a, td_b))$ $m(wu_a, wu_b) = \text{match}(wu_a, wu_b)$ $m(ns_a, ns_b) = |ns_a - ns_b|$, $m(vd_a, vd_b) = |vd_a - vd_b|$ $m(na_a, na_b) = |na_a - na_b|$, $m(sh_a, sh_b) = \text{edit}(sh_a, sh_b)$ $m(cc_a, cc_b) = \text{match}(cc_a, cc_b)$ $m(cp_a, cp_b) = \text{edit}(cp_a, cp_b)$ $m(tc_a, tc_b) = \text{edit}(tc_a, tc_b)$ $m(sp_a, sp_b) = \text{edit}(sp_a, sp_b)$ //edit(string$_1$, string$_2$) is edit distance between input strings// |a−b| measures absolute difference With respect to migration flow proximity, migration flows associated with two agents may be specified as follows:

migrationFlow(A) = $p_0 \to p_1 \to p_2 \to \ldots \to p_n$ migrationFlow(A) = $q_0 \to q_1 \to q_2 \to \ldots \to q_m$ For each pair of states in these flows, their pairwise proximity may be determined as follows:

stateProximity($p_i, q_j$)

In this regard, proximity between states $p_i$ and $q_j$ for all ($i \in 1 \ldots n; j \in 0 \ldots m$). Function stateProximity($p_i, q_j$) may be defined by design environment as follows:

$$stateProximity(p_i, q_j) = \begin{cases} 1 & \text{if } p_i = q_j \text{ (as per domain ontology)} \\ 0 & \text{otherwise} \end{cases}$$

With respect to pairwise state proximities, flow proximity $f_{fp}$ between these agents may be determined as follows:

$$f_{fp}(A, A') = (seqSim(Z_a, Z_b))^{-1}$$

$$seqSim(Z_a, Z_b) = \begin{cases} 0 & \text{if } n = 0 \text{ OR } m = 0 \\ seqSim(tail(Z_a), tail(Z_b)) & \text{if } Z_a[0] = Z_b[0] \\ 1 + seqSim(tail^2(Z_a), tail^2(Z_b)) & \text{if } C_{tr} \\ 1 + \lambda & \text{otherwise} \end{cases}$$

$$\lambda = \min \begin{cases} seqSim(tail(Z_a), Z_b) \\ seqSim(Z_a, tail(Z_b)) \\ seqSim(tail(Z_a), tail(Z_b)) \end{cases}$$

$Z_a = migrationFlow(A)$ $Z_b = migrationFlow(A')$ $tail(p_r \to p_{r+1} \to \ldots) = p_{r+1} \to \ldots$ $tail^2(Z) = tail(tail(Z))$ With respect to unified proximity estimation, in terms of technical contextual proximity measured by $f_{cp}(\ldots)$, and migration flow proximity measured by $f_{fp}(\ldots)$, unified proximity between two agents may be determined as $sim_{up}(\ldots)$:

$sim_{up}(A,A') = w_{cp}f_{cp}(A,A') + w_{fp}f_{dp}(A,A')$ $w_{cp}, w_{fp} \in [0, \ldots]$ are weights, which correspond with relative significances of different proximities between issues.

By default, $w_{fp}=2$, $w_{cp}=4$. With availability of statistically significant data, these weights may be learnt by applying regression techniques.

At block 208, the migration action relevance analyzer 124 may identify, based on a maximum relevance associated with the allowed and error-response migration actions for states that are similar to the current state of the application migration, a migration action 128 that is to be performed for the application migration. In this regard, for each action x ∈ L, the migration action relevance analyzer 124 may determine the relevance of action x as follows:

$$rel(A, x, A') = sim_{up}(A, A') \times e^{\frac{1}{td}}$$

$td = t - timestamp(A', x, s$ $timestamp(A', x)$:

time stamp when action x was executed by agent $A'$

The migration action relevance analyzer 124 may identify agent B ∈ Δ with maximum relevance for agent A with respect to action x. This agent B may be maximally similar with agent A, and as well as its executed action x from the same state possibly most recently. Relevance of action x with respect to agent B may be specified as v=rel(A,x,B). At this point agent A has for each potential action x in L, maximally similar agents that possibly carded out those actions most recently.

if planned (A,s) ∉ L (the action originally planned for agent A) has also been carried out by some other agent, then:

rel(A,δ)=(α*rel(A,δ)+(1−α)β(s))

δ=planned(A,s) and

β(s) ∈ [0,1]: relevance set at configuration time for each planned action of agent A (it is state dependent)

α ∈ [0,1]: relative weight given to relevance score of planned actions of agent A in comparison to relevance estimated by considering external agents Else (e.g., action planned for migration agent A has not been carded out by any other agent):

rel(A,δ)=β(s)

Across all the actions x ∈ L, agent A, may normalize relevance scores in the range 0-1 as follows:

$$g = \sum_{x \in L \cup \{\delta\}} rel(A, x)$$

$$\forall x \in L: rel(A, x) \leftarrow \frac{rel(A, x)}{g}$$

Agent A may take that action z ∈ L having highest relevance score:

$$rel(A, z) = \max_{x \in L \cup \{\delta\}} rel(A, x)$$

Agent A may further determine a likelihood of success of executing action z as all the agents which executed z, divided by those which did not encounter error after executing it as follows:

$$Prob\left(s \xrightarrow{z} s'\right) = \frac{\text{Number of agents reaching non error states } s' \text{ on executing } z \text{ in state } s}{\text{Number of agents executing } z \text{ in state } s}$$

At block 210, the migration agent controller 130 may execute, by the migration agent 104 that is to perform the application migration from the first cloud environment 106 to the second cloud environment 108, the identified migration action 128. Thus, $A_i$ may complete the current migration step (e.g., state transition) by executing the identified action z.

At block 212, the migration action broadcaster 134 may broadcast, based on the execution of the identified migration action 128, the identified migration action 128 to the plurality of additional migration agents 110. In this regard, each migration agent after completing an action Z (e.g., at block 210) may broadcast the following details to all other active migration agents:

Previous state where action as taken
Time stamp at the point of taking the action
Is action as per original migration plan?
Did action lead to an error state?
  If YES
    Relevant parameters associated with the error
    Response action At block 214, the migration agent controller 130 may determine whether the identified migration action 128 leads to an error state, an intermediate migration state, or a success state. Further, based on a determination that the identified migration action 128 leads to the intermediate migration state, the migration agent controller 130 may generate an indication to determine a next migration action that is to be performed for the application migration. Further, based on a determination that the identified migration action leads to the success state, the migration agent controller 130 may generate an indication of completion of the application migration. Thus, at block 214, a determination may be made as to whether the action lead to a success state.

IF YES
  Exit( )
Else IF
  Go to block 202

Figure 3:
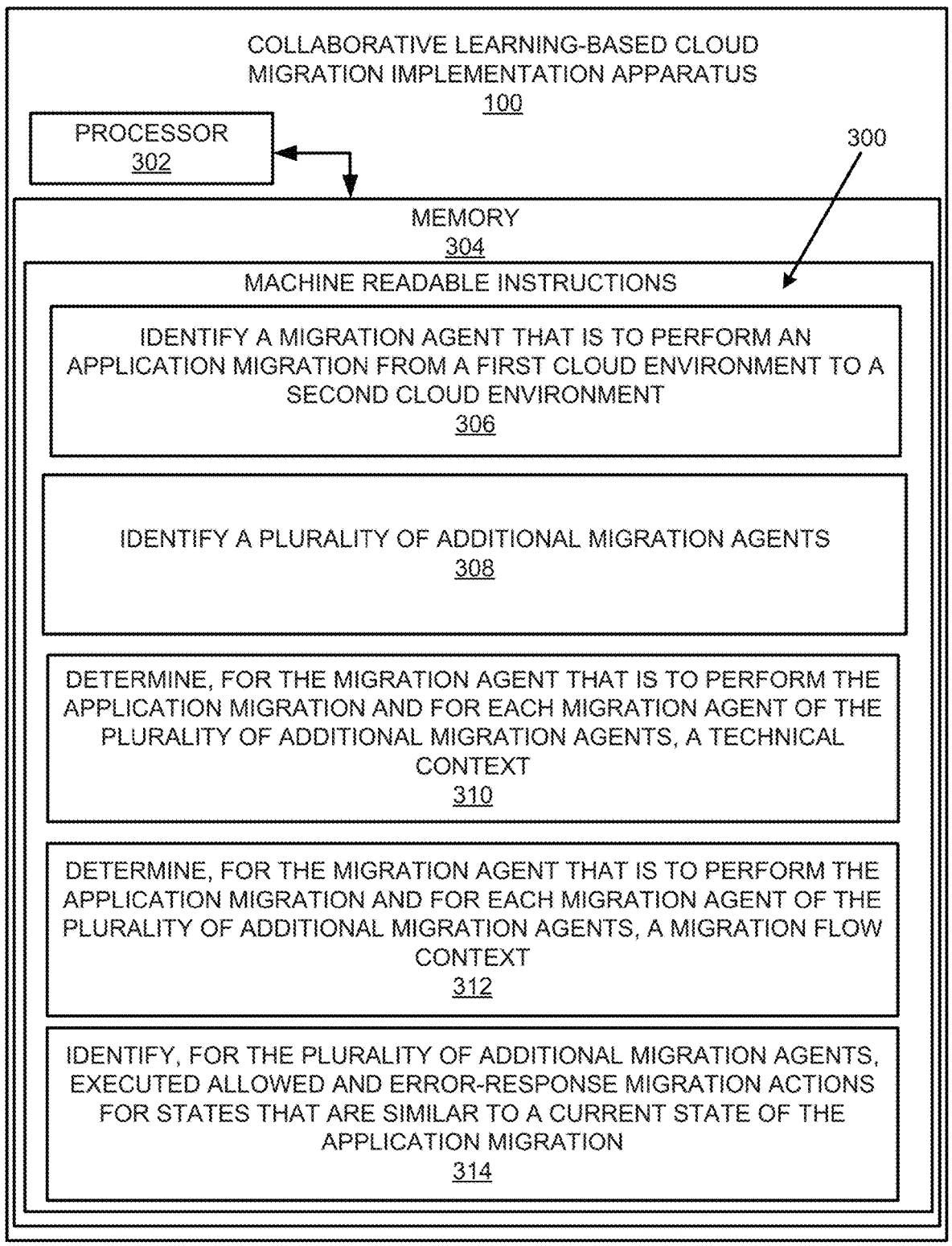
FIG. 3 illustrates an example block diagram for collaborative learning-based cloud migration implementation in accordance with an example of the present disclosure.
Figure 3:
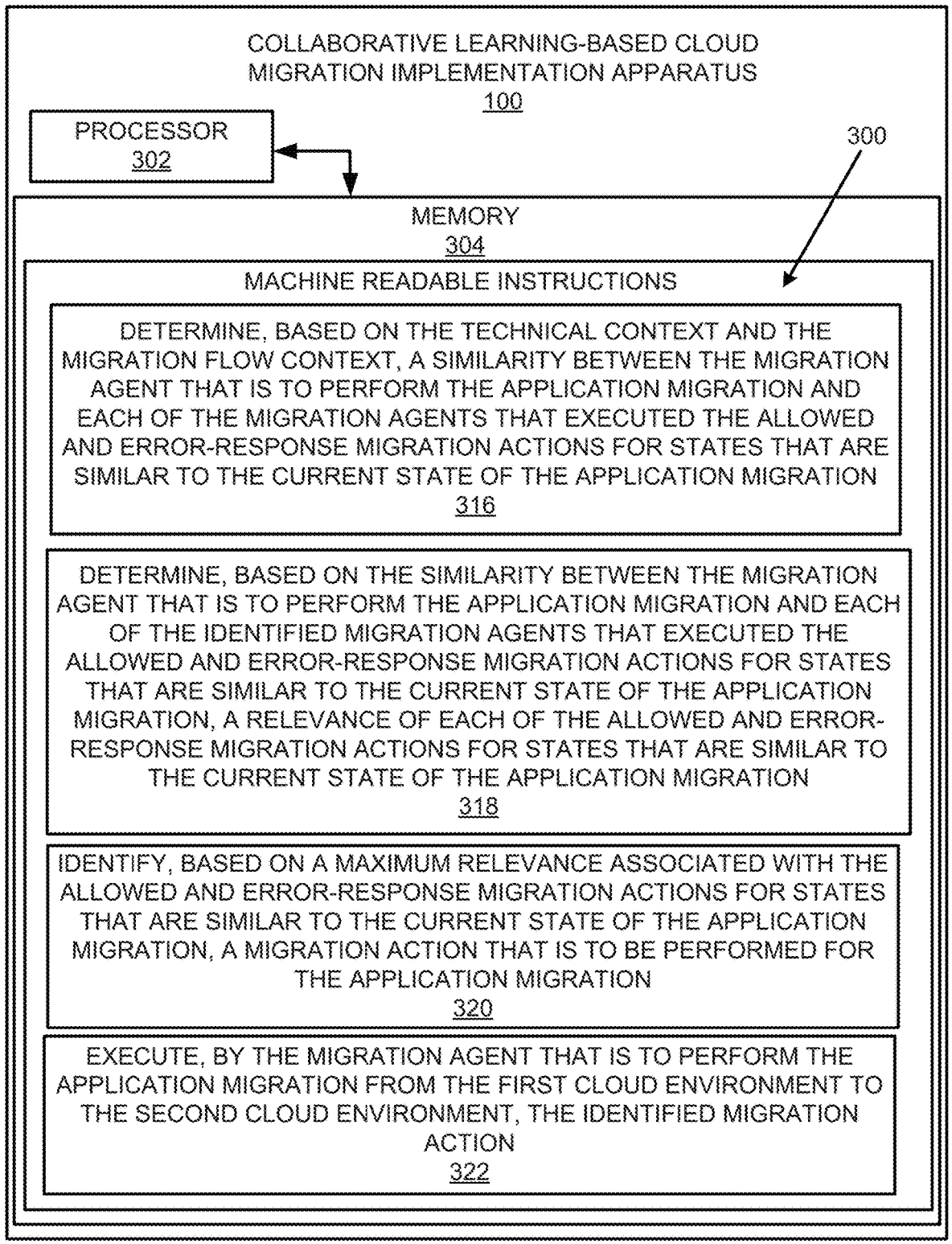
Figure 5:
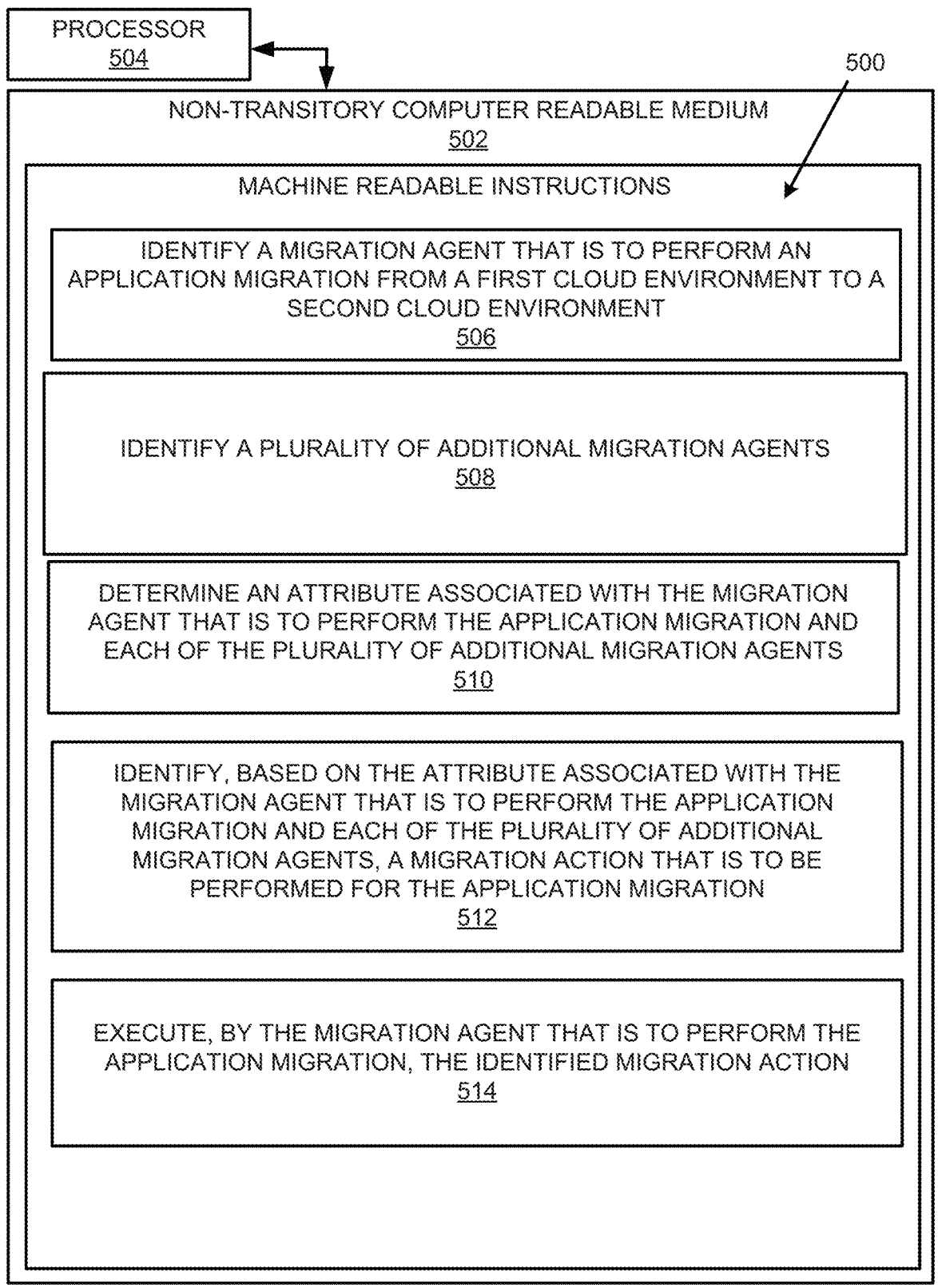
FIG. 5 illustrates a further example block diagram for collaborative learning-based cloud migration implementation in accordance with another example of the present disclosure.

FIGS. 3-5 respectively illustrate an example block diagram 300, a flowchart of an example method 400, and a further example block diagram 500 for collaborative learning-based cloud migration implementation, according to examples. The bock diagram 300, the method 400, and the block diagram 500 may be implemented on the apparatus 100 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for collaborative learning-based cloud migration implementation, and the steps of the method. FIG. 5 may represent a non-transitory computer readable medium 502 having stored thereon machine readable instructions to provide collaborative learning-based cloud migration implementation according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to identify a migration agent 104 that is to perform an application migration from a first cloud environment 106 to a second cloud environment 108.

The processor 302 may fetch, decode, and execute the instructions 308 to identify a plurality of additional migration agents 110.

The processor 302 may fetch, decode, and execute the instructions 310 to determine, for the migration agent 104 that is to perform the application migration and for each migration agent of the plurality of additional migration agents 110, a technical context 114.

The processor 302 may fetch, decode, and execute the instructions 312 to determine, for the migration agent 104 that is to perform the application migration and for each migration agent of the plurality of additional migration agents 110, a migration flow context 118.

The processor 302 may fetch, decode, and execute the instructions 314 to identify, for the plurality of additional migration agents 110, executed allowed and error-response migration actions for states that are similar to a current state of the application migration.

The processor 302 may fetch, decode, and execute the instructions 316 to determine, based on the technical context 114 and the migration flow context 118, a similarity 122 between the migration agent 104 that is to perform the application migration and each of the migration agents that executed the allowed and error-response migration actions for states that are similar to the current state of the application migration.

The processor 302 may fetch, decode, and execute the instructions 318 to determine, based on the similarity 122 between the migration agent 104 that is to perform the application migration and each of the identified migration agents that executed the allowed and error-response migration actions for states that are similar to the current state of the application migration, a relevance 126 of each of the allowed and error-response migration actions for states that are similar to the current state of the application migration.

The processor 302 may fetch, decode, and execute the instructions 320 to identify, based on a maximum relevance associated with the allowed and error-response migration actions for states that are similar to the current state of the application migration, a migration action 128 that is to be performed for the application migration.

The processor 302 may fetch, decode, and execute the instructions 322 to execute, by the migration agent 104 that is to perform the application migration from the first cloud environment 106 to the second cloud environment 108, the identified migration action 128.

Referring to FIGS. 1 and 4, and particularly FIG. 4, for the method 400, at block 402, the method may include identifying a migration agent 104 that is to perform an application migration from a first cloud environment 106 to a second cloud environment 108.

At block 404 the method may include identifying a plurality of additional migration agents 110.

At block 406, the method may include determining a similarity 122 between the migration agent 104 that is to perform the application migration and each of the plurality of additional migration agents 110.

At block 408, the method may include determining, based on the similarity 122 between the migration agent 104 that is to perform the application migration and each of the plurality of additional migration agents 110, relevance values (e.g., the relevance 126).

At block 410, the method may include identifying, based on the relevance values, a migration action 128 that is to be performed for the application migration.

At block 412, the method may include executing, by the migration agent 104 that is to perform the application migration, the identified migration action 128.

Referring to FIGS. 1 and 5, and particularly FIG. 5, for the block diagram 500, the non-transitory computer readable medium 502 may include instructions 506 to identify a migration agent 104 that is to perform an application migration from a first cloud environment 106 to a second cloud environment 108.

The processor 504 may fetch, decode, and execute the instructions 508 to identify a plurality of additional migration agents 110.

The processor 504 may fetch, decode, and execute the instructions 510 to determine an attribute (e.g., the similarity 122) associated with the migration agent 104 that is to perform the application migration and each of the plurality of additional migration agents 110.

The processor 504 may fetch, decode, and execute the instructions 512 to identify, based on the attribute associated with the migration agent 104 that is to perform the application migration and each of the plurality of additional migration agents 110, a migration action 128 that is to be performed for the application migration.

The processor 504 may fetch, decode, and execute the instructions 514 to execute, by the migration agent 104 that is to perform the application migration, the identified migration action 128.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A collaborative learning-based cloud migration implementation apparatus comprising:
   a migration agent identifier, executed by at least one hardware processor, to
      identify a migration agent that is to perform an application migration from a first cloud environment to a second cloud environment, and
      identify a plurality of additional migration agents;
   a technical context analyzer, executed by the at least one hardware processor, to
      determine, for the migration agent that is to perform the application migration and for each migration agent of the plurality of additional migration agents, a technical context;
   a migration flow context analyzer, executed by the at least one hardware processor, to
      determine, for the migration agent that is to perform the application migration and for each migration agent of the plurality of additional migration agents, a migration flow context;
   an agent similarity analyzer, executed by the at least one hardware processor, to
      identify, for the plurality of additional migration agents, executed allowed and error-response migration actions for states that are similar to a current state of the application migration, and
      determine, based on the technical context and the migration flow context, a similarity between the migration agent that is to perform the application migration and each of the migration agents that executed the allowed and error-response migration actions for states that are similar to the current state of the application migration;
   a migration action relevance analyzer, executed by the at least one hardware processor, to
      determine, based on the similarity between the migration agent that is to perform the application migration and each of the identified migration agents that executed the allowed and error-response migration actions for states that are similar to the current state of the application migration, a relevance of each of the allowed and error-response migration actions for states that are similar to the current state of the application migration, and
      identify, based on a maximum relevance associated with the allowed and error-response migration actions for states that are similar to the current state of the application migration, a migration action that is to be performed for the application migration; and a migration agent controller, executed by the at least one hardware processor, to
execute; by the migration agent that is to perform the application migration from the first cloud environment to the second cloud environment, the identified migration action.

2. The collaborative learning-based cloud migration implementation apparatus according to claim 1, wherein the agent similarity analyzer is executed by the at least one hardware processor to determine, based on the technical context and the migration flow context, the similarity between the migration agent that is to perform the application migration and each of the migration agents that executed the allowed and error-response migration actions for states that are similar to the current state of the application migration by:
determining, based on the technical context and the migration flow context, unified proximity; and
determining, based on the unified proximity, the similarity between the migration agent that is to perform the application migration and each of the migration agents that executed the allowed and error-response migration actions for states that are similar to the current state of the application migration.

3. The collaborative learning-based cloud migration implementation apparatus according to claim 1, further comprising:
an migration action broadcaster, executed by the at least one hardware processor, to
broadcast, based on the execution of the identified migration action, the identified migration action to the plurality of additional migration agents.

4. The collaborative learning-based cloud migration implementation apparatus according to claim 3, wherein the migration action broadcaster is executed by the at least one hardware processor to broadcast, based on the execution of the identified migration action, the identified migration action to the plurality of additional migration agents by:
broadcasting the current state of the application migration and a time stamp associated with the identified migration action to the plurality of additional migration agents.

5. The collaborative learning-based cloud migration implementation apparatus according to claim 1, wherein the migration agent controller is executed by the at least one hardware processor to:
determine whether the identified migration action leads to an error state, an intermediate migration state, or a success state; and
based on a determination that the identified migration action leads to the intermediate migration state, generate an indication to determine a next migration action that is to be performed for the application migration.

6. The collaborative learning-based cloud migration implementation apparatus according to claim 1, wherein the migration agent controller is executed by the at least one hardware processor to:
determine whether the identified migration action leads to an error state, an intermediate migration state, or a success state; and
based on a determination that the identified migration action leads to the success state, generate an indication of completion of the application migration.

7. The collaborative learning-based cloud migration implementation apparatus according to claim 1, wherein the agent similarity analyzer is executed by the at least one hardware processor to determine, based on the technical context and the migration flow context, the similarity between the migration agent that is to perform the application migration and each of the migration agents that executed the allowed and error-response migration actions for states that are similar to the current state of the application migration by:
determining, based on the technical context and the migration flow context, a time-difference based similarity between the migration agent that is to perform the application migration and each of the migration agents that executed the allowed and error-response migration actions for states that are similar to the current state of the application migration.

8. The collaborative learning-based cloud migration implementation apparatus according to claim 1, wherein the technical context analyzer is executed by the at least one hardware processor to determine, for the migration agent that is to perform the application migration and for each migration agent of the plurality of additional migration agents, the technical context by:
determining the technical context as a function of a project context, a migration context, and an architectural context.

9. The collaborative learning-based cloud migration implementation apparatus according to claim 1, wherein the migration agent controller is executed by the at least one hardware processor to:
determine a likelihood of success of executing the identified migration action.

10. A method for collaborative learning based cloud migration implementation, the method comprising:
identifying, by at least one hardware processor, a migration agent that is to perform an application migration from a first cloud environment to a second cloud environment;
identifying, by the at least one hardware processor, a plurality of additional migration agents;
determining, by the at least one hardware processor, a similarity between the migration agent that is to perform the application migration and each of the plurality of additional migration agents;
determining, by the at least one hardware processor, based on the similarity between the migration agent that is to perform the application migration and each of the plurality of additional migration agents, relevance values;
identifying, by the at least one hardware processor, based on the relevance values, a migration action that is to be performed for the application migration; and
executing, by the at least one hardware processor, by the migration agent that is to perform the application migration, the identified migration action.

11. The method for collaborative learning-based cloud migration implementation according to claim 10, wherein determining, by the at least one hardware processor, the similarity between the migration agent that is to perform the application migration and each of the plurality of additional migration agents further comprises:
determining, by the at least one hardware processor, for the migration agent that is to perform the application migration and for each migration agent of the plurality of additional migration agents, a technical context;
determining, by the at least one hardware processor, for the migration agent that is to perform the application migration and for each migration agent of the plurality of additional migration agents, a migration flow context;

identifying, by the at least one hardware processor, for the plurality of additional migration agents, executed allowed and error-response migration actions for states that are similar to a current state of the application migration;

determining, by the at least one hardware processor, based on the technical context and the migration flow context, the similarity between the migration agent that is to perform the application migration and each of the migration agents that executed the allowed and error-response migration actions for states that are similar to the current state of the application migration.

12. The method for collaborative learning-based cloud migration implementation according to claim 11, wherein identifying, by the at least one hardware processor, based on the relevance values, the migration action that is to be performed for the application migration further comprises:

identifying, by the at least one hardware processor, based on a maximum relevance value associated with the allowed and error-response migration actions for states that are similar to the current state of the application migration, the migration action that is to be performed for the application migration.

13. A non-transitory computer readable medium having stored thereon machine readable instructions, the machine readable instructions, when executed by at least one hardware processor, cause the at least one hardware processor to:

identify a migration agent that is to perform an application migration from a first cloud environment to a second cloud environment;

identify a plurality of additional migration agents;

determine an attribute associated with the migration agent that is to perform the application migration and each of the plurality of additional migration agents;

identify, based on the attribute associated with the migration agent that is to perform the application migration and each of the plurality of additional migration agents, a migration action that is to be performed for the application migration; and execute, by the migration agent that to perform the application migration, the identified migration action.

14. The non-transitory computer readable medium according to claim 13, wherein the attribute includes a similarity between the migration agent that is to perform the application migration and each of the plurality of additional migration agents.

15. The non-transitory computer readable medium according to claim 14, wherein the machine readable instructions to determine the similarity between the migration agent that is to perform the application migration and each of the plurality of additional migration agents, when executed by the at least one hardware processor, further cause the at least one hardware processor to:

determine, for the migration agent that is to perform the application migration and for each migration agent of the plurality of additional migration agents, a technical context.

16. The non-transitory computer readable medium according to claim 15, wherein the machine readable instructions to determine the similarity between the migration agent that is to perform the application migration and each of the plurality of additional migration agents, when executed by the at least one hardware processor, further cause the at least one hardware processor to:

determine, for the migration agent that is to perform the application migration and for each migration agent of the plurality of additional migration agents, a migration flow context.

17. The non-transitory computer readable medium according to claim 16, wherein the machine readable instructions to determine the similarity between the migration agent that is to perform the application migration and each of the plurality of additional migration agents, when executed by the at least one hardware processor, further cause the at least one hardware processor to:

identify, for the plurality of additional migration agents, executed allowed and error-response migration actions for states that are similar to a current state of the application migration.

18. The non-transitory computer readable medium according to claim 17, wherein the machine readable instructions to determine the similarity between the migration agent that is to perform the application migration and each of the plurality of additional migration agents, when executed by the at least one hardware processor, further cause the at least one hardware processor to:

determine, based on the technical context and the migration flow context, the similarity between the migration agent that is to perform the application migration and each of the migration agents that executed the allowed and error-response migration actions for states that are similar to the current state of the application migration.

19. The non-transitory computer readable medium according to claim 18, wherein the machine readable instructions to identify, based on the similarity between the migration agent that is to perform the application migration and each of the plurality of additional migration agents, the migration action that is to be performed for the application migration, when executed by the at least one hardware processor, further cause the at least one hardware processor to:

determine, based on the similarity between the migration agent that is to perform the application migration and each of the plurality of additional migration agents, relevance values; and identify, based on the relevance values, the migration action that to be performed for the application migration.

20. The non-transitory computer readable medium according to claim 19, wherein the machine readable instructions to identify, based on the relevance values, the migration action that is to be performed for the application migration, when executed by the at least one hardware processor, further cause the at least one hardware processor to:

identify, based on a maximum relevance value associated with the allowed and error-response migration actions for states that are similar to the current state of the application migration, the migration action that is to be performed for the application migration.

\* \* \* \* \*